(12) United States Patent
Fukuda et al.

(10) Patent No.: US 7,958,530 B2
(45) Date of Patent: Jun. 7, 2011

(54) TELEVISION RECEIVER, MOBILE APPARATUS, AND NETWORK INFORMATION COMMUNICATION SYSTEM WITH NOTIFICATION OF DECODE ERROR BY TURNING ON DECODE FLAG OF TCP/IP HEADER

(75) Inventors: Tetsu Fukuda, Kanagawa (JP); Takashi Yamamoto, Kanagawa (JP); Shuntaro Aratani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1434 days.

(21) Appl. No.: 10/992,744

(22) Filed: Nov. 22, 2004

(65) Prior Publication Data

US 2005/0122391 A1  Jun. 9, 2005

(30) Foreign Application Priority Data

Dec. 9, 2003  (JP) ................. 2003-410801

(51) Int. Cl.
  *H04N 7/14* (2006.01)
  *H04B 7/185* (2006.01)
(52) U.S. Cl. ............ 725/62; 370/395.52; 455/3.02; 455/69; 725/81; 725/133
(58) Field of Classification Search ............. 725/62, 725/74, 78, 82, 81; 348/452.2, 425.2; 370/395.52; 455/3.02, 69
See application file for complete search history.

(56) References Cited

U.S. PATENT DOCUMENTS

| | | | |
|---|---|---|---|
| 7,508,940 B2 * | 3/2009 | Kato et al. ........... | 380/200 |
| 7,516,164 B2 * | 4/2009 | Wakabayashi et al. ....... | 707/201 |
| 2002/0019982 A1 | 2/2002 | Aratani et al. | |
| 2002/0052975 A1 | 5/2002 | Yamamoto et al. ........... | 709/251 |
| 2002/0063797 A1 | 5/2002 | Aratani et al. | |
| 2002/0089610 A1 | 7/2002 | Ohno et al. | |
| 2002/0118749 A1* | 8/2002 | Gentric et al. ........... | 375/240.08 |
| 2002/0181938 A1* | 12/2002 | Tsumagari et al. ............. | 386/95 |

(Continued)

FOREIGN PATENT DOCUMENTS

| | | |
|---|---|---|
| JP | 2002-77839 | 3/2002 |
| WO | WO 99/12349 | 3/1999 |

OTHER PUBLICATIONS

U.S. Appl. No. 09/506,939, Tomoyuki Ono Atsushi Mizutome Shuntaro Aratani, filed Feb. 18, 2000.

(Continued)

*Primary Examiner* — Joseph P Hirl
*Assistant Examiner* — Brett Rustemeyer
(74) *Attorney, Agent, or Firm* — Fitzpatrick, Cella, Harper & Scinto

(57) ABSTRACT

In a system for viewing accumulated contents by using a cellular phone, if an error prevents the content to be viewed, a simple operation is performed to view the rest at home. In accordance with a viewing request from a cellular phone, a television receiver, while sequentially receiving data from D-VHS, converts the data into a format suitable for reception and play in a cellular phone by using an encoder. After this format conversion, the television receiver stores in a play position memory a time stamp indicating a position information of a content and a sequence number used for transmission in TCP/IP. The cellular phone notifies the television receiver of a decode error of a reception data. When receiving a confirmation response of a normal play from the cellular phone, the television receiver clears the data of the play position memory, and otherwise holds the data of the play position memory.

6 Claims, 12 Drawing Sheets

U.S. PATENT DOCUMENTS

| | | |
|---|---|---|
| 2003/0142236 A1 | 7/2003 | Aratani et al. |
| 2003/0208778 A1 | 11/2003 | Aratani et al. |
| 2004/0049788 A1 | 3/2004 | Mori et al. |
| 2004/0052504 A1* | 3/2004 | Yamada et al. ............... 386/68 |
| 2004/0068746 A1 | 4/2004 | Mori et al. |
| 2004/0148629 A1 | 7/2004 | Shibamiya et al. |
| 2004/0179811 A1 | 9/2004 | Kikkawa et al. |
| 2004/0252671 A1* | 12/2004 | Lee et al. ...................... 370/349 |
| 2004/0261136 A1 | 12/2004 | Aratani et al. |
| 2005/0071876 A1* | 3/2005 | Van Beek ...................... 725/62 |
| 2006/0288375 A1* | 12/2006 | Ortiz et al. .................... 725/62 |
| 2007/0011709 A1* | 1/2007 | Katz et al. ..................... 725/87 |
| 2008/0092168 A1* | 4/2008 | Logan et al. ................... 725/44 |

OTHER PUBLICATIONS

U.S. Appl. No. 09/694,504, Shuntaro Aratani, filed Oct. 24, 2000.

U.S. Appl. No. 10/944,735, Tomoyuki Ohno Shuntaro Aratani Katsuhiro Miyamoto, filed Sep. 21, 2004.

U.S. Appl. No. 10/998,652, Masaki Kutsuna Yuichi Matsumoto Takashi Yamamoto Shigeki Mori, filed Nov. 30, 2004.

U.S. Appl. No. 10/998,744, Takashi Yamamoto Masaki Kitsuna Yuichi Matsumoto Shigeki Mori, filed Nov. 30, 2004.

U.S. Appl. No. 11/004,956, Yuichi Matsumoto Takashi Yamamoto Kutsuna Masaki Shigeki Mori, filed Dec. 7, 2004.

* cited by examiner

| RESERVE AREAS (6-BIT) | RESERVE | RESERVE | RESERVE | RESERVE | RESERVE | DECODE ERROR |
|---|---|---|---|---|---|---|
|  | 0 | 0 | 0 | 0 | 0 | 1 |

TELEVISION RECEIVER, MOBILE APPARATUS, AND NETWORK INFORMATION COMMUNICATION SYSTEM WITH NOTIFICATION OF DECODE ERROR BY TURNING ON DECODE FLAG OF TCP/IP HEADER

BACKGROUND OF THE INVENTION

1. Field of the Invention

The present invention relates to a television receiver and a network information communication system, and more particularly to a television receiver and a network information communication system which are used in a network system that links to a mobile terminal as an information terminal apparatus and enables a user to control/view a content controllable by a television receiver in a home even away from home, and which can provide the user with a viewing environment, in which a re-viewing can be easily executed by using the television receiver without any special operation, even if various errors occur on the mobile terminal receiving/displaying the content on the move, leading to a difficult situation to view the content on the mobile terminal.

2. Related Background Art

Expectations are growing for a technique that enables a digital broadcast wave to be viewed by using the mobile terminal such as a cellular phone, a Personal Digital Assistance (PDA), or the like, and a technique that enables a broadcast content received by the television receiver or accumulated contents controllable by the television receiver, to be transmitted to and viewed by the mobile terminal. Those techniques enable a user to enjoy viewing the content even away from a living room of a home.

A ground wave digital broadcast, which employs Orthogonal Frequency Division Multiplex (OFDM), is strong against multi-path interference. Thus, even if the movement causes the interference condition of the electric wave to be changed from moment to moment, the electric wave can be received by using a small antenna built in an apparatus without using a large antenna such as an outdoor installation type, without the image being easily disordered. The technique in which the broadcast content is viewed by using the mobile terminal is about to be established on the basis of the above-mentioned technical features.

Also, there is a demand that the once-accumulated content be received by using the mobile terminal. Such an apparatus, method, and system as to meet the demand are noted in JP 2002-77839 A. In the technique noted in JP 2002-77839 A, a recording request is transmitted from the mobile terminal through a network to a recorder with a television broadcast receiving function, and the recorder receiving this request records the designated content. The recorder also transmits the recorded content through the network to the mobile terminal in accordance with the instruction from the mobile terminal. The usage of this technique enables the user to view the accumulated contents away from home by using the mobile terminal.

The network system that enables the content of the television receiver in the home to be controlled and viewed away from home by using the mobile terminal, and a television receiver used therein, is a technique that is great in user needs and extremely promising.

Due to such techniques, the user can avoid the risk that the user misses the desired content because the user goes out suddenly unexpectedly or forgets a recording reservation, and the user can also view the desired content on the move. Thus, the user can further effectively utilize the time.

The following problems are found out from the above-mentioned technical considerations of the inventors of the present invention. For example, in the mobile terminal on the move, errors are often induced depending on a reception state. If such an error makes the normal viewing difficult, it may be an option that the user views the continuation of the content after returning home. However, the operation at that time becomes troublesome.

Also, it is assumed that the user is moving while viewing the content controllable by the television receiver, by using the mobile terminal away from home. If the user is moving by transportation means at a relatively high speed, for example, by train or by car, the reception environment of the mobile terminal is changing from moment to moment. Sometimes, the user may possibly enter the area such as the inside of a tunnel where the reception state is bad, or may possibly go outside the range of the reception coverage area of the mobile terminal. In such cases, the mobile terminal cannot receive the electric wave, which leads to the state of a reception error, and the content cannot be provided to the user. Other than such a reception error, the various errors related to the operation state of the mobile terminal may possibly occur such as a communication error caused by the communication load situation of a line and a decode error caused by the processing performance of the mobile terminal. Naturally, similar errors also occur on the move even at a low speed such as during a walk, although there is a difference in degree.

As mentioned above, if an error occurs, when the mobile terminal is used away from home to view the content controllable by the television receiver, thereby making the viewing difficult, the inventors of the present invention assume that the user again views the content after returning home. If the user is especially fond of the content, the case that the user again views it from the beginning is sufficiently conceivable. However, the inventors of the present invention assume that the user usually skips over the already-viewed portion and again views it from the portion where the viewing became difficult.

Depending on the manner of the error occurrence at the mobile terminal, if there are several places where the viewing is difficult, the viewing method may be considered to check only the portions after returning home.

In those various situations, when the user, after returning home, sets the television receiver at the viewable state in order to again view the content and then displays the content on the television receiver, if the replay position of the content differs from the desired position, the user cannot view the content from the desired position before carrying out fast-forwarding and rewinding operations or equivalent operations to adjust the replay position. In this way, the user is forced to carry out the plurality of the above-mentioned operations at a time immediately after returning home. Moreover, if the number of the replay positions desired to be viewed is plural, all of the desired places can be viewed only after the above-mentioned operations are repeated many times.

The consumer product such as a television set is considered to be used by a wider range of users layers, differently from a personal computer and the like. Some of the users are far from being acquainted with the minute operation of the apparatus. It is very difficult to imagine that such users willingly carry out the above-mentioned operations. Even an excellent technique that is greatly expected by the user will not come into widespread use unless it is supported by the user from the viewpoint of the user interface.

In this way, when the continuation of the content viewed by using the mobile terminal away from home is viewed by using the television receiver, excellent operability is desired from the viewpoint of the user interface.

SUMMARY OF THE INVENTION

It is therefore an object of the present invention to provide a television receiver, a network terminal, and a network control system, which enable a desired content to be simply viewed.

The present invention provides a network information communication system and a television receiver, the network information communication system including:

a television receiver; and an information terminal apparatus which are connected through a network;

the system communicating an image data therebetween, wherein the information terminal apparatus includes:

communicating means for receiving the image data from the television receiver; and display means for displaying the image data, wherein the television receiver includes:

communicating means for transmitting the image data to the information terminal apparatus; and storage means for storing a play position information of the image data in accordance with at least one of an operation state and a communication state of the information terminal apparatus of which the information terminal apparatus notifies the television receiver.

Here, the operation state of the information terminal apparatus in the present invention implies a processing operation such as decoding or de-multiplexing of image/audio data, and the communication state implies the transmission/reception state of the data to and from the television receiver.

Also, the present invention provides an information communication system and an information terminal apparatus, the information communication system including:

an information controller; and the information terminal apparatus;

the system distributing a data from the information controller to the information terminal apparatus, through a network, wherein the information controller includes:

communicating means for transmitting the data to the information terminal apparatus and receiving an information transmitted from the information terminal apparatus; and storage means for storing a play position information of the data in accordance with the information, wherein the information terminal apparatus includes:

communicating means for receiving the data transmitted from the information controller and transmitting the information corresponding to the data to the information controller; and playing means for playing the data received by the communicating means.

Here, the information referred to in the present invention is, for example, a sequence number of a TCP/IP header and a time stamp of a content.

According to the present invention, even if the error occurs on the mobile terminal receiving/displaying the content on the move, leading to a difficult situation to view the content on the mobile terminal, it is possible to provide the user with a viewing environment that enables the desired content to be easily viewed by using the television receiver without any special operation, allowing the user to avoid the troublesome operation.

When again viewing the content in which the operation is expected to be troublesome, it is possible to attain a comfortable viewing environment by providing the optimal user interface and system.

Even if the various errors occur on the mobile terminal receiving/displaying the content on the move, leading to a difficult situation to view the content on the mobile terminal, it is possible to provide the user with a viewing environment where the re-viewing of the lost image screen can be easily executed by using the television receiver without any special operation.

If the error on the mobile terminal receiving/displaying the content of the television receiver on the move brings about the portion at which the content viewing on the mobile terminal is impossible or the portion at which the viewing is difficult, it is possible to provide the user with a viewing environment, which enables the user to avoid the troublesome operation for searching for the desired portion and then viewing it and to view the desired content without any special setting, when the user again views the content by using the television receiver after returning home.

DESCRIPTION OF THE PREFERRED EMBODIMENTS

Embodiments of the present invention will be described below in detail with reference to the accompanying drawings.

First Embodiment

Figure 1:
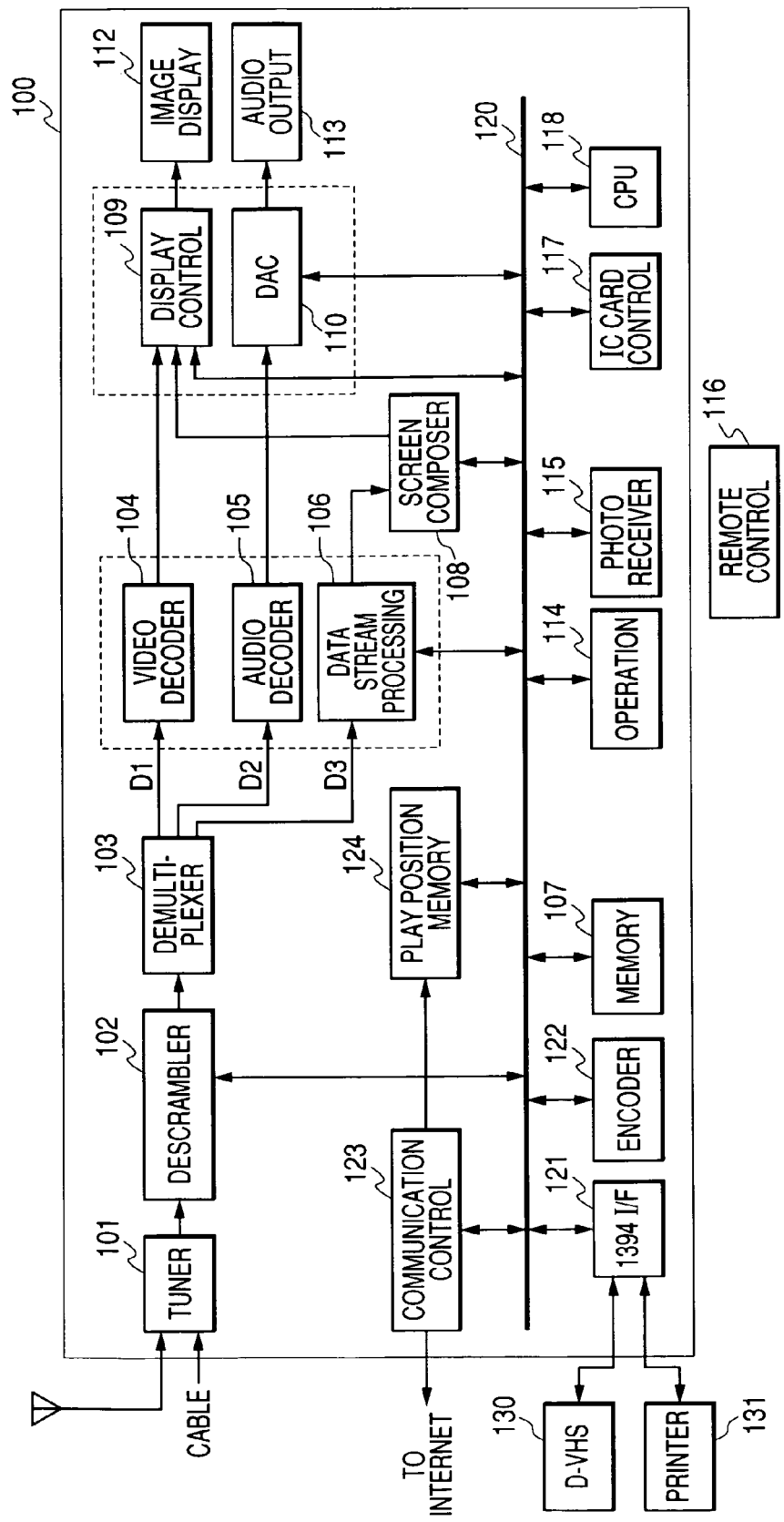
FIG. 1 is a schematic configuration block diagram showing a television receiver according to a first embodiment of the present invention.

FIG. 1 is a schematic configuration block diagram of a digital television receiver 100 (information controller) that is an example of the present invention.

A signal received by an antenna (not shown) is inputted to a tuner 101. The tuner 101 performs the processes of demodulation, error correction, and the like on an input signal, and generates digital data of a type referred to as a transport stream. The generated transport stream (TS) data is inputted to a descrambler 102.

If the TS data scrambled for the viewing limit is inputted from the tuner 101, the descrambler 102 releases the scrambling, on the basis of key information for descrambling that is included in the TS data and key information outputted from an IC card controller 117, and outputs the TS data after the scrambling is released, to a de-multiplexer 103.

The IC card controller 117 includes an IC card that stores the contract information of a user and the key information to decode the key information for the descrambling included in the TS data. If there is the key information to decode the key information for the descrambling that is inputted from the descrambler 102, the IC card controller 117 outputs the key information to the descrambler 102.

Also, the descrambler 102, if receiving the TS data that is not scrambled from the tuner 101, outputs the TS data directly to the de-multiplexer 103. Output data from the descrambler 102 is the TS data in which image/audio data corresponding to a plurality of channels, an electronic program guide (EPG) data, data broadcast data, and the like are time-division multiplexed.

The de-multiplexer 103 extracts an image data D1 and an audio data D2 of a channel selected with the operation of an operation 114 or a remote control 116, from the TS data inputted from the descrambler 102, and outputs the image data D1 to a video decoder 104, and the audio data D2 to an audio decoder 105. Also, the de-multiplexer 103 extracts a data broadcast/EPG data D3 from the TS data, and outputs the data to a data stream processor 106. The data broadcast/EPG data processed by the data stream processor 106 is captured through a bus 120 by a memory 107, and stored in a recording medium (not shown) after the software processing of CPU 118.

The TS data is sent on a packet basis. Packet Identification (PID) is added to the leading portion of the packet. The de-multiplexer 103 reads the PID and consequently identifies the image data D1, the audio data D2, and the data broadcast/EPG data D3.

The process of the image data is explained. The video decoder 104 performs an MPEG-2 decoding process on the image data D1 outputted from the de-multiplexer 103, and outputs the decoded image data to a display controller 109. The display controller 109 switches or multiplexes the image data from the video decoder 104 and a screen composer 108, on the basis of the operation of the remote control 116, and displays the image on an image display 112. If a plurality of image data, audio data, and data broadcast/EPG data are received, the images are synthesized here, and an image signal for displaying the image is outputted to the image display 112. The image display 112 includes a monitor (not shown) and an image signal input terminal.

Next, the process of the audio data is explained. The audio decoder 105 performs the MPEG-2 decoding process on the audio data D2 outputted from the de-multiplexer 103 and applies the decoded audio data to a digital/analog converter (DAC) 110. The DAC 110 converts the audio data outputted from the audio decoder 105 into an analog signal and applies the signal to an audio output 113. The audio output 113 includes a speaker (not shown) and an audio signal input terminal.

The process of the data broadcast/EPG data D3 is explained. The electronic program guide (EPG) data is sent with a data structure specified by a standard rule "Program Exhibition Information Used for Digital Broadcast" in Association of Radio Industries and Businesses (commonly known as "ARIB") and the like. As the main configuration data, there are: Service Description Table (SDT) to send the information with regard to an organization channel such as a name of an organization channel, a name of a broadcast service provider and the like; Bouquet Association Table (BAT) to send the information with regard to a bouquet such as a name of a bouquet (a set of organization channels), a contained organization channel and the like; Event Information Table (EIT) to transmit the information with regard to the program such as a name of a program, a broadcast start date and time, an explanation of a content and the like; Time Data Table (TDT) to transmit the information of a current date and time; and the like.

The data broadcast/EPG data D3 includes the data such as the SDT, EIT, TDT, and the like. The data stream processor 106 firstly reads out the TDT, and obtains the information of a current time, and also outputs the information of the current time to a CPU 118. The CPU 118 judges a time band of the EPG display corresponding to the current time and outputs the proper time band information to the data stream processor 106.

Next, the data stream processor 106 reads out the SDT from the memory 107, in accordance with the time band information from the CPU 118, confirms the presence or absence of a program listing, and obtains the information of channel names of private and different streams, a channel number and the like. The data stream processor 106 further reads out the EIT from the memory 107 and obtains the information of a program name in each channel of the private and different streams, its start time, explanations of a category and a program and the like. The data stream processor 106 performs a decoding process on the data broadcast/EPG data D3 read out from the memory 107 and outputs the decoded EPG data to the screen composer 108.

The screen composer 108 outputs a character signal to constitute the EPG screen to the display controller 109, in accordance with the EPG data from the data stream processor 106.

The display controller 109 outputs the image signal to the image display 112, so as to switch between the image related to the image data outputted by the video decoder 104 and the EPG screen related to the character signal outputted by the screen composer 108, in response to the operations of the operation 114 and the remote control 116 and then display it. The display controller 109, if there is a designation operation of displaying the EPG screen displaying through the operation 114 and the remote control 116, outputs the EPG screen of the character signal outputted by the screen composer 108 to the image display 112.

In a data broadcast, digital data is repeatedly sent out from a broadcast station in accordance with a DSM-CC data carousel method specified in ISO/IEC 13818-6. The data broadcast data filtered by the de-multiplexer 103 includes text information, script information, image information, and image/audio data. The text information is described by Extensible Markup Language (XML) specified by W3C.

The data stream processor 106 performs the decoding process on: the EPG data composed of the text information and the image information; and the data broadcast data composed of the text information, the image information and the image/audio data, from the data broadcast/EPG data D3. Those data are stored through the bus 120 in the memory 107.

A photo receiver 115 receives the operation information of a user from the remote control 116, as an infrared signal and transmits the signal through the bus 120 to the CPU 118.

The CPU 118 integrally controls the television receiver 100, in accordance with various kinds of information.

Moreover, an IEEE 1394 interface 121, an encoder 122, a communication controller 123 and a play position memory 124 are connected to the bus 120. The IEEE 1394 interface 121 is used to connect an external D-VHS 130, a printer 131 and the like to the television receiver 100. The encoder 122 is used to convert the accumulated content data from a recording medium (not shown) and the D-VHS 130 into a data format suitable for the reception/play on the mobile terminal. The communication controller 123 is connected to the Internet and can communicate with the mobile terminal by using TCP/IP. The play position memory 124 stores the sequence number of the TCP/IP header and the time stamp of the content as a play start position of the content sent by the communication controller 123. The play position memory 124 will be described in detail later.

Figure 2:
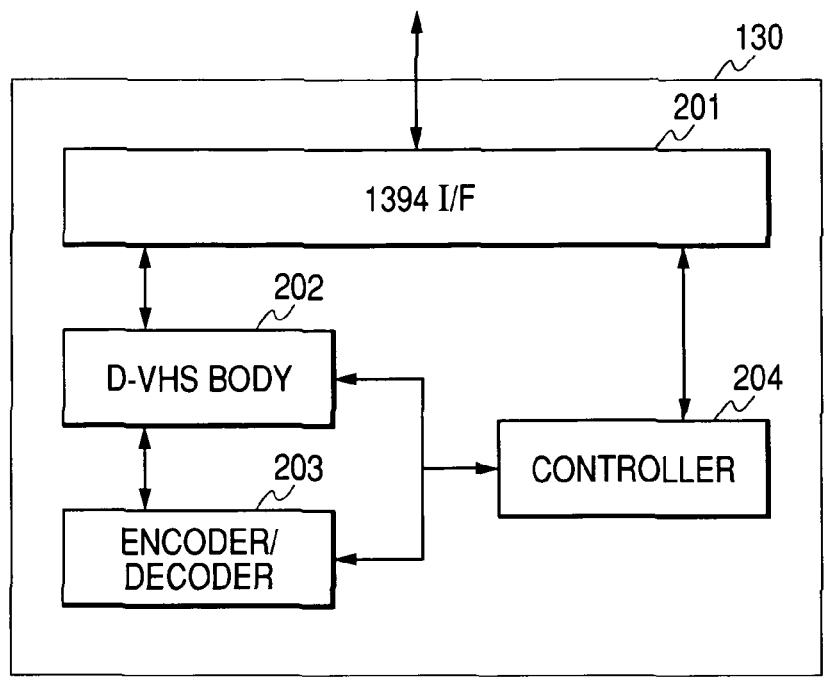
FIG. 2 is a schematic configuration block diagram showing D-VHS 130.

Referring to FIG. 2, explanation is given of the D-VHS 130. The IEEE 1394 interface 201 is connected to another IEEE 1394 interface, namely in this embodiment, the IEEE 1394 interface 121 of the television receiver 100. A D-VHS body 202 records the image/audio data on the recording medium, and plays the recorded image/audio data (video data) on the recording medium. An encoder/decoder 203 converts a data format in order to send and receive the image data to and from the television receiver 100. A controller 204 integrally controls the D-VHS body 202 and the encoder/decoder 203.

The television receiver 100, if receiving the control request of the D-VHS 130 from the user through the remote control 116 and a mobile terminal which will be described later, uses the IEEE 1394 and a communication protocol based on an AV/C command and controls the D-VHS 130. The accumulated contents as explained here are assumed to be accumulated in the D-VHS 130.

Figure 3:
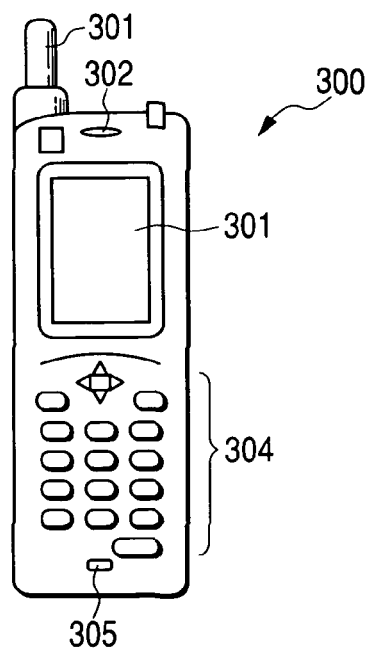
FIG. 3 is a diagram showing an appearance of a cellular phone 300.
Figure 4:
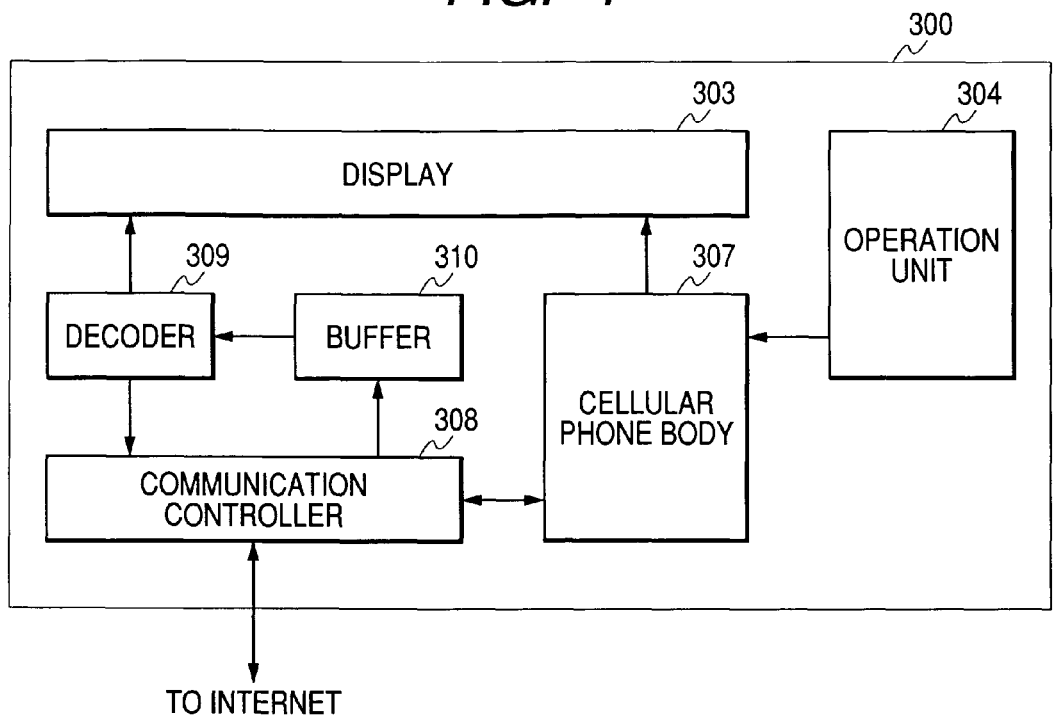
FIG. 4 is a schematic configuration block diagram showing the cellular phone 300.

FIG. 3 shows the appearance of the mobile terminal (information terminal apparatus), and FIG. 4 is a schematic configuration block diagram of the mobile terminal.

In a cellular phone 300, an antenna 301 for transmission and reception is attached such that it can be pulled out and accommodated. A voice of a call designation is outputted from a speaker 302. A display 303 displays various kinds of information regarding an electric wave state, a stored telephone book, and the like and also displays the content data from the television receiver 100. An operation key 304 for various operations includes a numeric keypad. A microphone 305 collects the voice of the user at a time of a telephone call. A cellular phone body 307 provides the function of the typical cellular phone including the antenna 301 and the microphone 305. A communication controller 308 has a function of connecting to the Internet via a simple transport protocol through a server installed in a public line network. A decoder 309 decodes the content data received by the communication controller 308 and outputs it to a display 303. A buffer memory 310 is prepared to carry out window control by using a simple transport protocol.

Figure 5:
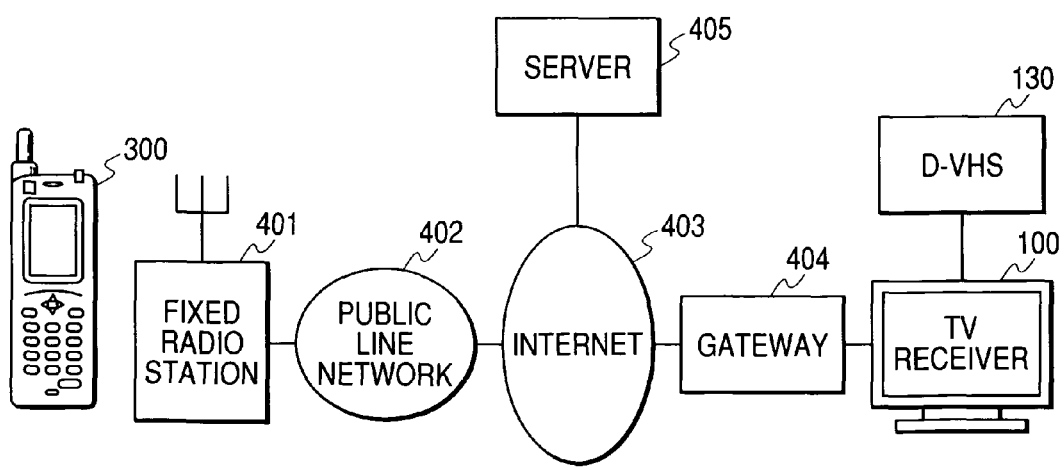
FIG. 5 is a diagram showing a configuration example of a network system.

FIG. 5 shows an example of the network system used in this embodiment. The cellular phone 300 is connected by radio to a fixed radio station 401, for example, through Wideband-Code Division Multiple Access (W-CDMA) and the like. The W-CDMA has a data transmission performance of 144 kbps at a time of a high speed movement, 384 kbps at a time of walking, and 2 Mbps at rest, and a real-time communication through a moving image and voice is possible. The fixed radio station 401 further functions as a gateway, and acts as the interface between TCP and wireless Profiled TCP (w-TCP) which will be described later.

The fixed radio station 401 is connected through a wire to the public line network 402, and the public line network 402 is connected to an internet 403 and many subscriber wired terminals (not shown) and a computer network. Servers 405 including WWW servers are connected to the internet 403, as necessary. The cellular phone 300 and the television receiver 100 can communicate with those servers, in accordance with the TCP/IP protocol. A gateway 404 functions as the interface between the internet 403 and the television receiver 100.

The television receiver 100 controls the connected D-VHS 130 and sends out the content through the internet 403 to the mobile terminal 300. The TCP/IP protocol is entirely used from the television receiver 100 through the internet 403 to the fixed radio station 401. The above-mentioned w-TCP is used as the simple transport protocol from the fixed radio station 401 to the cellular phone 300.

The w-TCP is briefly explained. UDP/IP that has less communication sequence than that of the TCP/IP has been conventionally used in a radio communication whose traffic is small. However, in the UDP/IP, it is impossible to receive a large amount of data. Hence, the w-TCP is designed such that several parameter settings existing in the TCP/IP are tuned for the radio communication. This can be considered to be generated by giving a default value suitable for the radio communication to the TCP/IP, rather than by generating a new protocol. In this embodiment, the TCP/IP is partially extended and used. For example, a reserve area of a part of a header is used to detect a decode error. Here, an extended specification to be used will be described later in detail.

In the network system shown in FIG. 5, the control signal can be transmitted from the cellular phone 300 to the television receiver 100. Also, the television receiver 100 can transmit the moving image data, which is the accumulated contents of the D-VHS 130, to the cellular phone 300. This operation is explained in detail.

Figure 6:
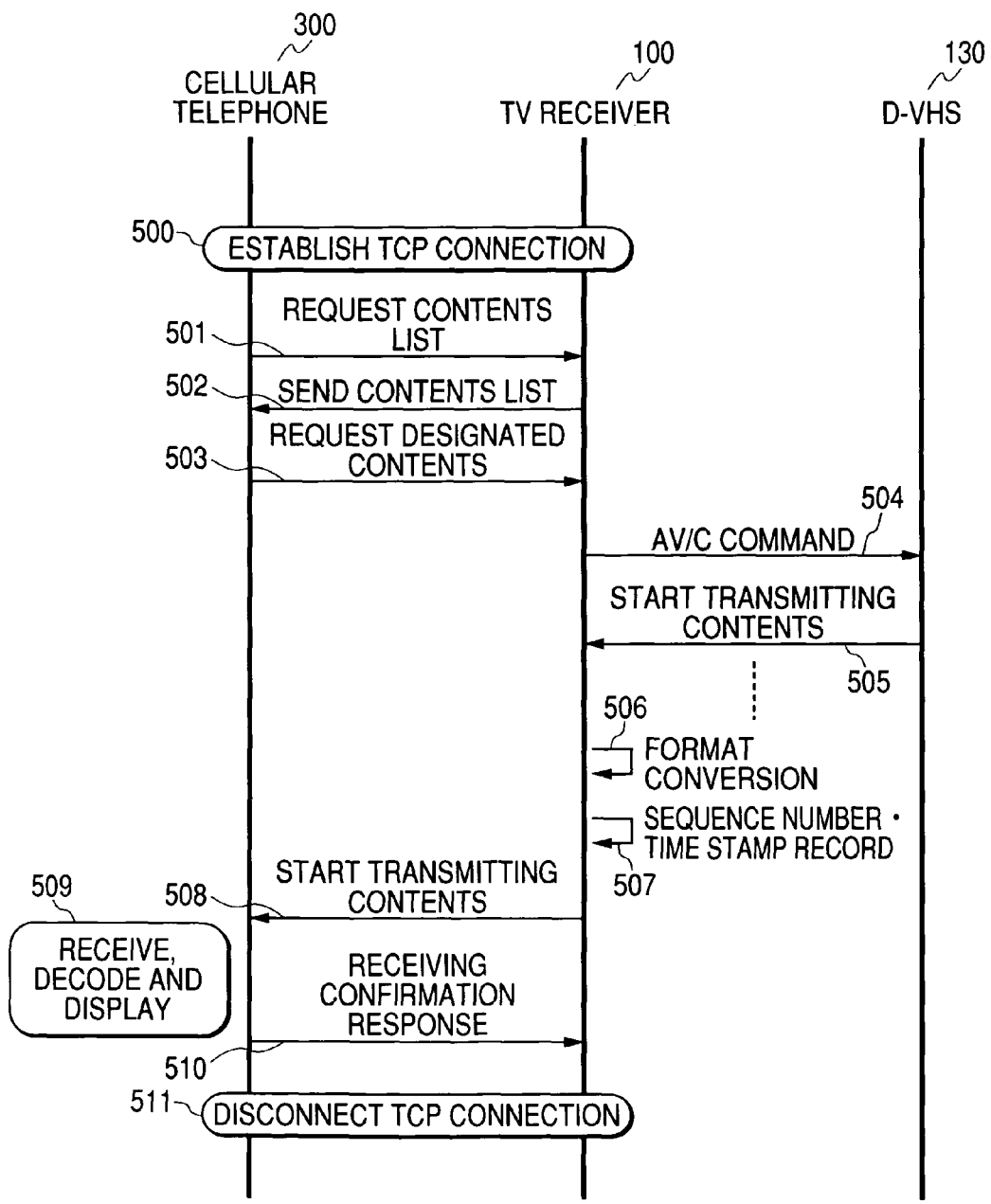
FIG. 6 is a diagram showing a control flow of data communications between the cellular phone 300, a television receiver 100, and the D-VHS 130.

FIG. 6 shows a data communication flow among the cellular phone 300, the television receiver 100 and the D-VHS 130.

The cellular phone 300 sends a command requesting a communication permission to the television receiver 100, in order to carry out the communication through the TCP/IP with the television receiver 100. The television receiver 100 receiving this command judges whether or not the communication is permitted. If permitted, it sends a command requesting a communication permission to the cellular phone 300 together with a notification to that effect. Since the cellular phone 300 receiving this command finally transmits a command indicating the communication permission to the television receiver 100, the TCP connection is established, and a communication path is secured (S500).

Figure 7:
FIG. 7 is a diagram showing an example of a content list displayed on a screen of the cellular phone 300.

When the establishment of the communication path is completed, the cellular phone 300 requests a controllable content list described in HTML of the television receiver 100 by using HTTP (S501). The controllable content by the television receiver 100 is, for example, the content of the apparatus connected through the IEEE 1394, the content accumulated in a built-in HDD, and the like. In this embodiment, it is the content of the D-VHS 130. The television receiver 100 receiving the request generates the list of the controllable content in accordance with the HTML and transmits it to the cellular phone 300 by using the HTTP (S502). FIG. 7 shows an example of the content list that is received and displayed by the cellular phone 300.

The user operates the GUI displayed on the display 303 of the cellular phone 300 by using the operation input 304 and selects the content to be desired to be viewed. If the user selects any content, the cellular phone 300 transmits a transmission request of the selected content to the television receiver 100 (S503).

The television receiver 100 receiving the content transmission request obtains the content from the apparatus that accumulates the designated content. That is, if recognizing that the designated content is stored in the D-VHS 130, it transmits an IEEE 1394 AV/C command to obtain the content, to the D-VHS 130 (S504). The D-VHS 130 receiving the AV/C command plays the content and transmits through the IEEE 1394 to the TV receiver 100 (S505).

The television receiver 100, while sequentially receiving the data from the D-VHS 130, converts data into the format suitable for the reception and play in the cellular phone 300 by using the encoder 122 (S506). After this format conversion, the television receiver 100 stores in the play position memory 124 the time stamp indicating the position information of the content and the sequence number used for the transmission in the TCP/IP (S507). Here, the time stamp represents the content play position that is common before and after the format conversion. With this information, the television receiver 100 can uniquely identify the position of the content where a transmission error or decode error occurs. The television receiver 100, after recording the play position, starts transmitting the content to the cellular phone 300 by using the TCP/IP (S508).

The cellular phone 300 receiving the content analyzes the TCP/IP header received by the communication controller 308 and sequentially stores in the buffer 310. The decoder 309 sequentially extracts and decodes the stored content data from the buffer 310 and displays the decoded data on the display 303 (S509). The cellular phone 300 returns a reception confirmation notification including the information of the presence or absence of an error to the television receiver 100 (S510).

With the above-mentioned procedure, the user can view the desired content by using the cellular phone 300.

When the contents are completely played or the communication is disconnected because of the deterioration in the communication situation, the television receiver 100 transmits a command indicating the end of the communication to the cellular phone 300. The cellular phone 300 receiving this command returns the response indicating the permission or rejection of the end and also transmits a communication end request to the television receiver 100. The television receiver 100 receiving this response returns the response indicating the allowance of the disconnection. Then, the disconnection of the TCP connection is completed (S511).

Figure 8:
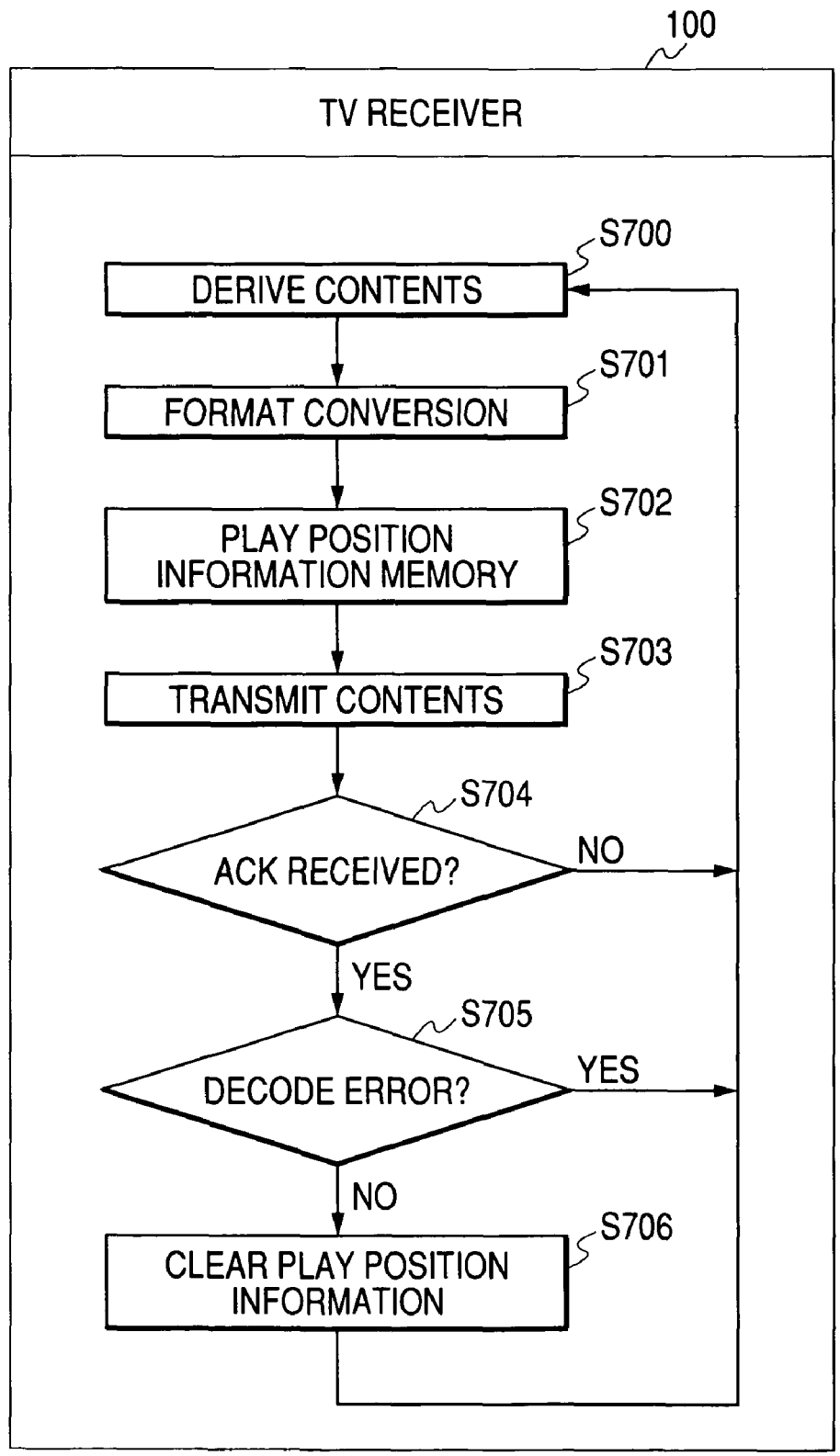
FIG. 8 is an explanatory diagram of an operation of the television receiver 100.

With reference to FIG. 8, the operation of the television receiver 100 will be described below in detail with regard to the communication with the cellular phone 300 from the obtainment of the accumulated contents.

As mentioned above, when the television receiver 100 derives the controllable accumulated contents (S700), it converts into the format suitable for the viewing in the cellular phone 300 by using the encoder 122 (S701).

The television receiver 100 transmits the data to the cellular phone 300 by using the TCP/IP after the format conversion. At that time, the sequence number used in the TCP header and the time stamp to identify the play position information of the content are associated and stored in the play position memory 124 (S702). The TCP header will be described later. The television receiver 100 transmits the content data to the cellular phone 300, as for the content, at the above-mentioned sequence number from the communication controller 123 (S703).

The TCP has the mechanism in which in order to attain the communication of a high reliability, if lost in the middle of communication, a TCP segment is detected and re-transmitted. As the case where the TCP segment is lost in the middle of communication, there are two cases where the transmitted TCP segment is lost in the middle of communication and the case where the response of the confirmation from the receiving side is lost in the middle of communication. Those communication errors are detected mainly by the television receiver 100. The television receiver 100, after transmitting the TCP segment, expects a confirmation response (ACK) corresponding thereto. If this confirmation response is not returned within a certain period, the television receiver 100 judges that the TCP segment is lost in the middle of communication. In the usual TCP/IP, the TCP segment is again transmitted. However, the television receiver 100 in this embodiment branches the process in accordance with the presence or absence of the confirmation response (S704).

If the confirmation response is not returned, the television receiver 100, while leaving the time stamp and the sequence number as the information with regard to the segment in the play position memory 124, starts transmitting a next segment. If the confirmation response is returned, the cellular phone 300 branches the process, based on whether or not the content can be normally provided to the user (S705). If the decode error or the like prevents the content from being provided to the user, similarly to the case where the confirmation response is not returned, the television receiver 100, while leaving the time stamp and the sequence number as the information with regard to the segment in the play position memory 124, starts transmitting the next segment. On the other hand, if the cellular phone 300 normally completes the play of the content, the television receiver 100 clears the information (the sequence number and the time stamp) with regard to the segment stored in the play position memory 124 and starts transmitting the next segment (S706).

With such a procedure, only the information of the play position when the communication error or decode error occurs is accumulated in the play position memory 124 of the television receiver 100. Also, if the communication error or decode error frequently occurs within a certain period, the television receiver 100 judges that the communication state with the cellular phone 300 is deteriorated, and disconnects the TCP connection to the cellular phone 300.

Figure 9:
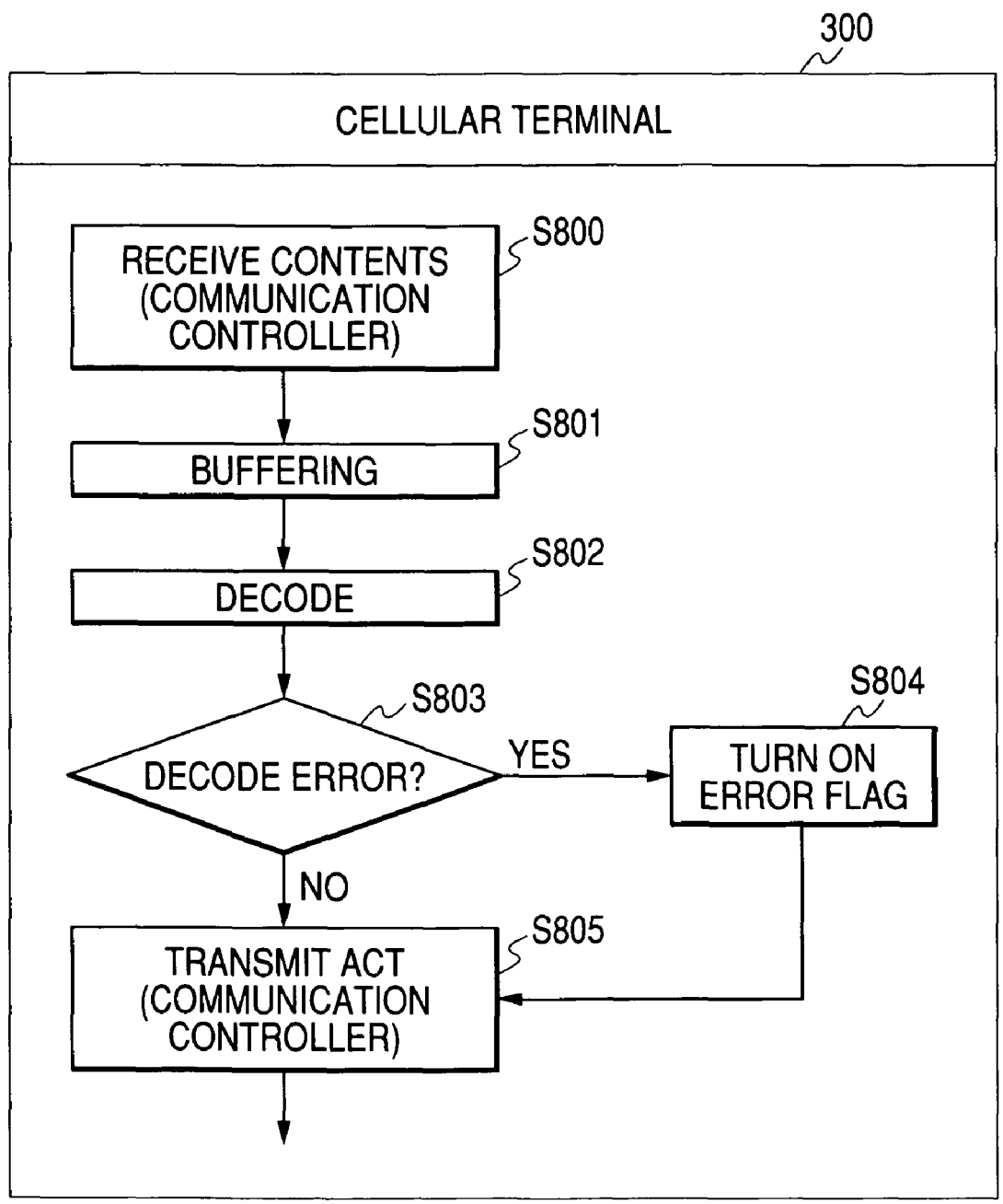
FIG. 9 is an explanatory diagram of an operation of the cellular phone 300.

FIG. 9 shows the flow of the operations of the cellular phone 300 with regard to the transmission of the confirmation response from the reception of the content. Referring to FIG. 9, the operations from the reception of the content in the cellular phone 300 to the transmission of the confirmation response will be described below in detail.

The cellular phone 300 receives the TCP segment transmitted from the television receiver 100 by the communication controller 308 (S800). The cellular phone 300 buffers the received data in the buffer 311 by the amount corresponding to a window size notified at the time of the TCP connection establishment (S801). After that, the decoder 309 sequentially starts the decoding (S802). Here, the process is branched, depending on whether or not the decode error occurs (S803) If the decode error does not occur, the confirmation response is returned in accordance with the usual TCP/IP process, and the flow proceeds to a next process (S803). On the other hand, if the decode error occurs and the content cannot be normally provided to the user, a decode error flag of the TCP header is turned on (S804) and the confirmation response is returned (S805). The decode error flag will be described later.

Figure 10:
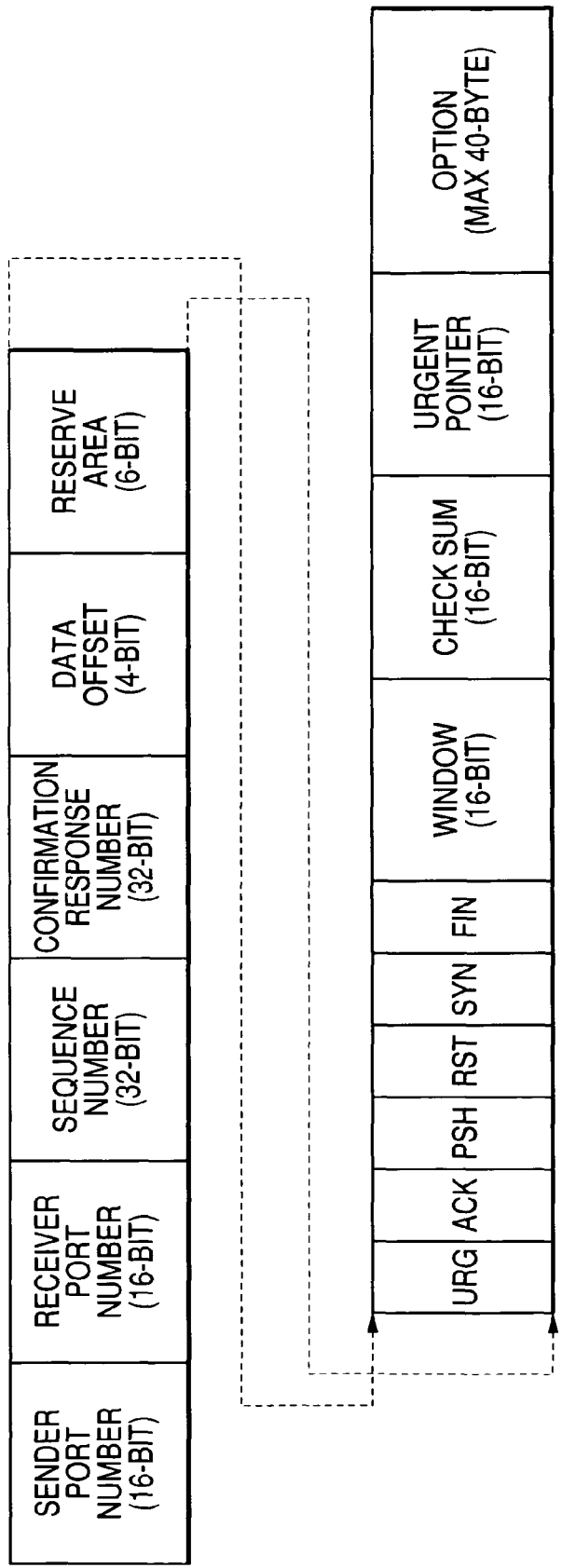
FIG. 10 is a diagram showing a format of a TCP header.

FIG. 10 shows the format of the TCP header applied in this embodiment. Each of a sender port number and a receiver port number is the information of 16 bits and identifies an application in which this TCP segment is used. Thus, numbers for identifying the application of the television receiver 100 and the application of the cellular phone 300 are noted therein.

The sequence number is the number incremented each time the TCP segment is sent, and this is used in order for the communication designation to recognize an order of the TCP segments. In this embodiment, as mentioned above, this sequence number and the time stamp of the content are associated and stored. Thus, even if the error occurs at the time of the communication, the play position of lost data can be specified.

Also, the confirmation response number is the number for notifying a partner that the TCP segment is normally received, and this is used together with the sequence number. Even if an error occurs in the cellular phone 300 at the time of the decoding, as long as the communication data can be normally received, the cellular phone 300 returns the data indicating this confirmation response number.

Figures 11, 12:
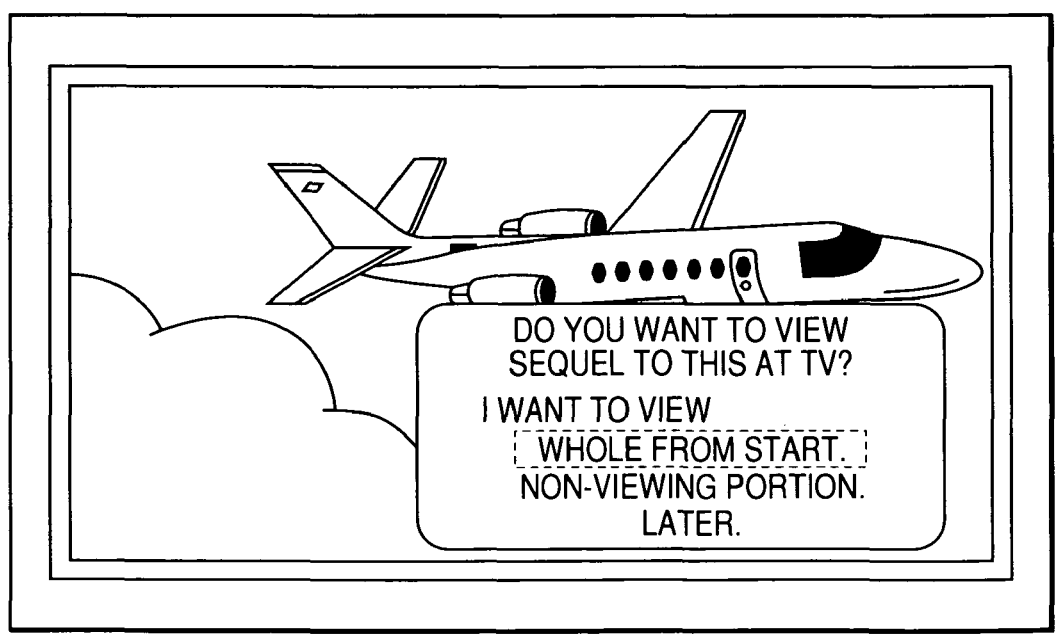
FIG. 11 is a diagram showing a role of each bit of a reservation region of the TCP header.
FIG. 12 is a diagram showing an example of a message displayed by the television receiver 100.

The reserve area is a 6 bit area, and this is the non-used area reserved for the future extension in the usual TCP/IP. In this embodiment, a part of this area is used to detect the presence or absence of the decode error. FIG. 11 is an explanatory view of the reserve area. The higher 5 bits noted as "Reserve" is not used even in this embodiment, and '0' is usually stored. If any error occurs in the decoder 309 of the cellular phone 300, '1' is stored in the least bit noted as "decode error". If the decoding is normally completed, '0' is stored. Since the reserve area is used as mentioned above, the television receiver 100 can detect the decode error in the cellular phone 300.

While the user views the content controllable by the television receiver 100 in the cellular phone 300, if the deterioration in the reception state and the like cause the communication error or decode error to frequently occur, it is supposed that the user abandons viewing the content and disconnects the communication. Also, if the electric wave reception itself is difficult, in response to this situation, the television receiver 100 may stop the transmission.

In such situation, the user, when viewing the content inevitably abandoned in the middle by using the television receiver 100 of the home after returning home, can view a part of the content that the user could not view away from home, namely, the portion after the paused point.

The television receiver 100 holds the position of the content, which the user could not view in the cellular phone 300, in the play position memory 124. After returning home, when the user turns on a power supply, the television receiver 100 displays a message as shown in FIG. 12 on the image display 112. If the user selects "I WANT TO VIEW ONLY NON-VIEWING PORTION" on the displayed GUI, the television receiver 100 determines the play start position from the time stamp stored in the play position memory 124, and sends the AV/C command instructing the play from that position to the D-VHS 130. Consequently, the television receiver 100 plays and displays the content from the portion that the user could not view.

In this way, in this embodiment, the user can view the content, which the user could not view away from home, by using the television receiver without retrieving the recording position manually.

This embodiment has been explained by using as an example the accumulated contents as the content controllable by the television receiver. However, this can be designed such that the content from the broadcast wave is used to start recording the content from the portion, which could not be viewed, on the storing medium, and it is provided to the user after the user returns home.

In this embodiment, the content of the D-VHS connected through the IEEE 1394 is used as the accumulated contents. However, it can be changed to the configuration that employs the hard disc drive (HDD) built in the television receiver or such other apparatuses.

This embodiment is designed such that the communication is carried out by using the TCP/IP. However, other communication protocols may be used.

This embodiment is designed such that the re-transmission is not performed in the cases of the communication error and the decode error. However, it is allowable to try a certain number of re-transmissions.

In this embodiment, the error to be notified by using the reserve area is only the decode error. However, the non-used reserve area can be used to notify the other errors.

This embodiment is designed such that the cellular phone is used as an example of the mobile terminal. However, it can be also applied to the configuration that employs a mobile communication apparatus such as a car navigation system.

Second Embodiment

A second embodiment of the present invention will be described below. The second embodiment has different features, with regard to the information to be stored in detecting the error according to the first embodiment, and a method of providing the content start position to the user. Then, only the point different from the first embodiment is explained.

Figure 13:
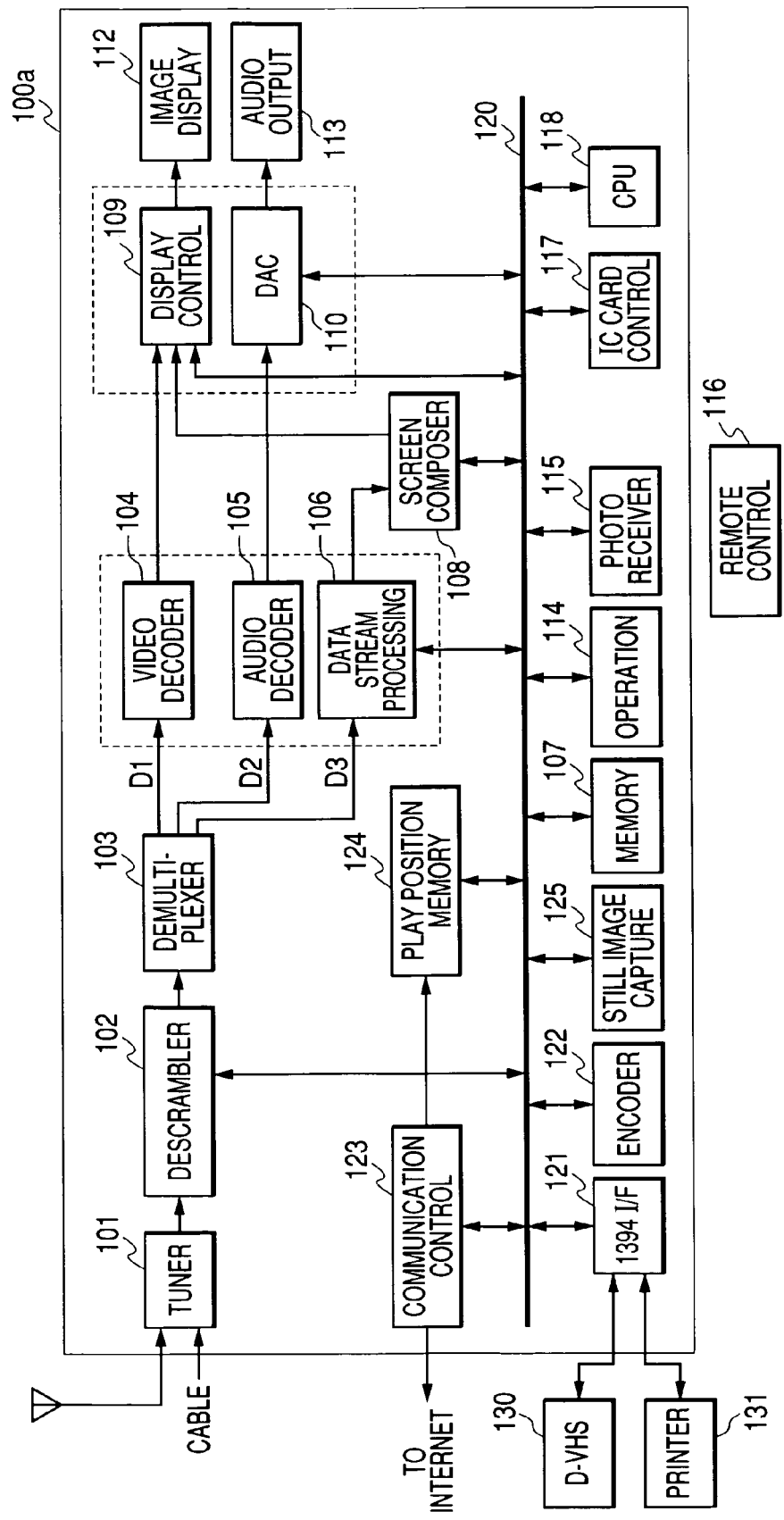
FIG. 13 is a schematic configuration block diagram showing of a television receiver 100a according to a second embodiment of the present invention.

FIG. 13 is a schematic configuration block diagram of a television receiver 100a according to the second embodiment. The same symbols are assigned to the same members for the television receiver 100 shown in FIG. 1. As a different point from the television receiver 100, the television receiver 100a has a still image capturer 125.

The television receiver 100a transmits the content to the cellular phone 300 by using the TCP/IP. In the television receiver 100a, prior to the content transmission, in addition to the time stamp of the content and the sequence number of the TCP/IP header, the still image information of the content corresponding to the time stamp is obtained by the still image capturer 125 and stored in the play position memory 124.

If the normal operation is confirmed by the confirmation response (ACK) from the mobile terminal, the information of the corresponding sequence number, time stamp and still image is cleared. On the other hand, if the communication error causes the TCP segment or confirmation response to be lost and the decode error to occur, the television receiver 100a continues to hold the information of the sequence number, time stamp and still image. The television receiver 100a keeps on transmitting the information as long as there is no transmission stop request from the cellular phone 300 issued by the user.

If the user inevitably abandoned viewing the content in the cellular phone 300 in the middle because of the communication error and the decode error, when returning home, the user can confirm a part of the content that could not be viewed away from home, in the television receiver 100a at the user's home.

Figure 14:
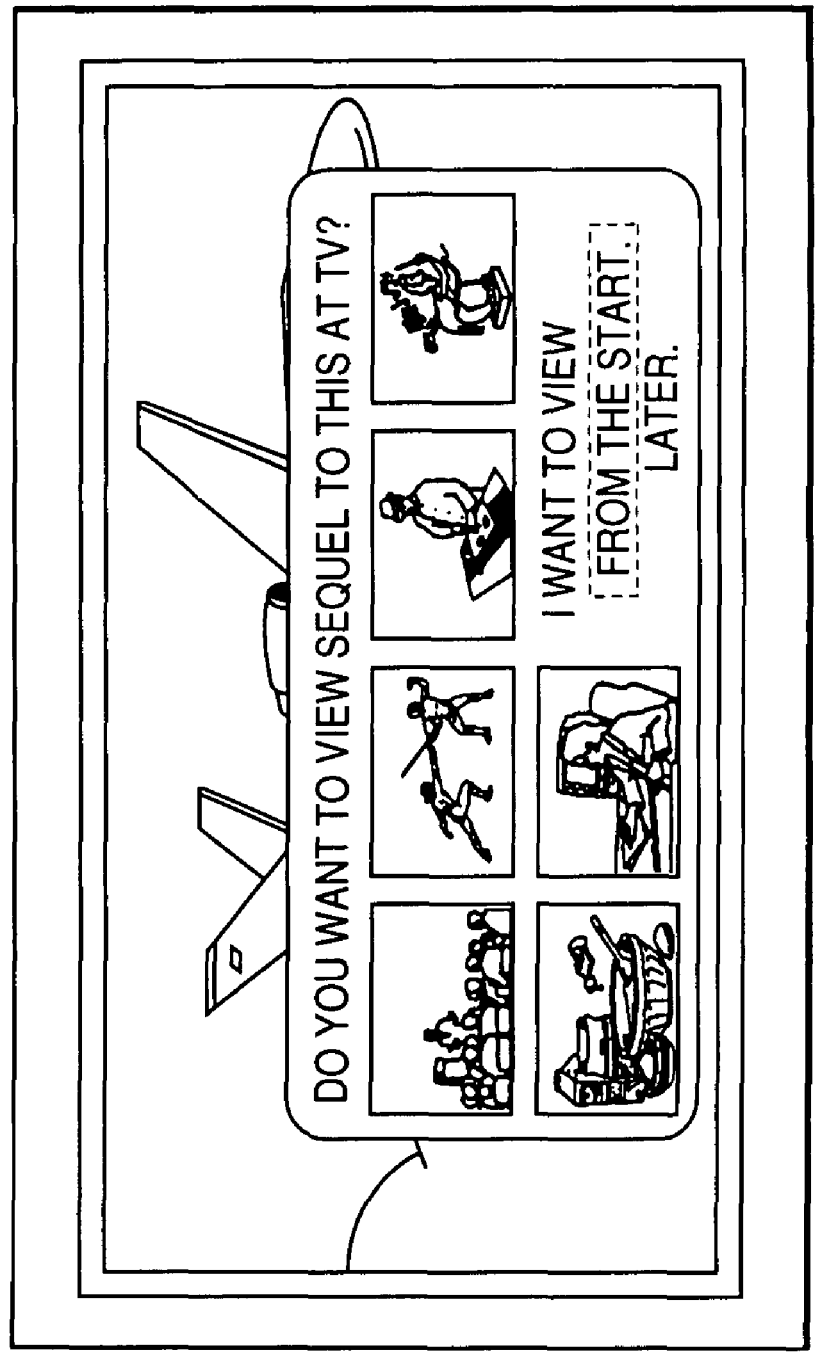
FIG. 14 is a diagram showing one example of a message displayed by a television receiver 100b.

The television receiver 100 holds the position of the content, which the user could not view in the cellular phone 300, and the still image corresponding thereto in the play position memory 124. When the user turns on the power supply after returning home, in the television receiver 100a, the Graphical User Interface (GUI) as shown in FIG. 14 is displayed on the image display 112 in accordance with the information held in the play position memory 124. If the continuous content information is held in the play position memory 124, the still image at the lead is used as an index. The still images of the content which the user could not view are listed and displayed as the index. When the user selects the particular still image by using the remote control 116 or operation 114, in the television receiver 100*a*, the play request from that position is transmitted to a D-VHS 200. Then, the content from that position is played.

With the above-mentioned procedure, the user can visually confirm desired content position and view the content in the television receiver, without manually retrieving the position of the content that could not be viewed away from home.

In this embodiment, the still image capturer 125 can be mounted even as the dedicated hardware or software.

This embodiment is designed so as to sequentially store the still image. However, it may be changed to the configuration for obtaining and displaying the still image data in accordance with the time stamp of the content when the index is generated.

This embodiment is designed such that the still image to specify the play position is displayed as the index. However, a slide show and other display/selection methods may be used.

Third Embodiment

A third embodiment of the present invention will be described below. The third embodiment has a feature different from the second embodiment in the method of providing the re-viewing content.

Figure 15:
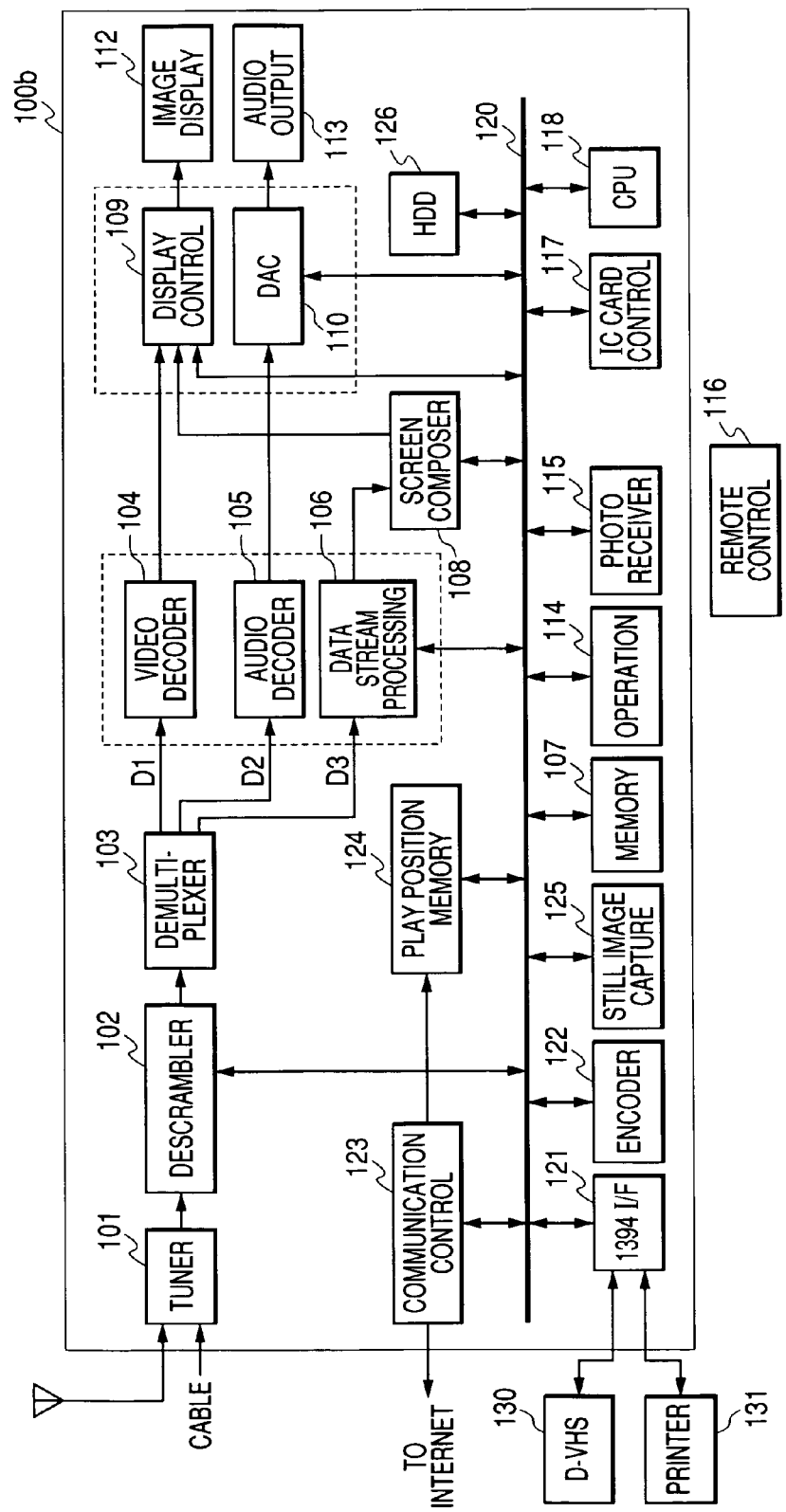
FIG. 15 is a schematic configuration block diagram showing the television receiver 100b according to a third embodiment of the present invention.

FIG. 15 is a schematic configuration block diagram of a television receiver 100*b* according to the third embodiment. The same symbols are given to the same members as in the embodiments shown in FIG. 1 and FIG. 13. An HDD 126 is added to the television receiver 100*b*.

In the television receiver 100*b*, prior to the content transmission, in addition to the time stamp of the content and the sequence number of the TCP/IP header, the still image information of the content corresponding to the time stamp is obtained by the still image capturer 125 and stored in the play position memory 124.

If the normal operation is confirmed by the confirmation response (ACK) from the mobile terminal, the information of the corresponding sequence number, time stamp and still image is cleared. On the other hand, if the communication error or decode error is detected, the information of the sequence number, time stamp and still image continues to be held.

If the communication error or decode error is continuously detected in a certain period, a digest stream of the content that is not displayed because of the error is generated at the timing when normal communication and normal decoding are confirmed, and it is held in the HDD 126. That period is the period until when the continuous information of the sequence number, time stamp and still image appears from when the error is first detected. It is recorded on the HDD 126 in the format suitable for the viewing in the television receiver 100*b*. That is, in recording onto the HDD 126, the conversion into the format suitable for the cellular phone 300 is not executed.

In the following explanation, if the error is detected and it is not continuous, in the television receiver 100*b*, the digest stream for 3 minutes is generated and accumulated in the HDD 126.

If the user inevitably abandoned viewing the content in the cellular phone 300 in the middle because of the communication error and the decode error, when returning home, the user can confirm a part of the content that could not be viewed away from home, by using the television receiver 100*a* at the user's home.

With the above-mentioned processes, the television receiver 100*b* holds the position of the content, which the user could not view in the cellular phone 300, and-the still image corresponding thereto, in the play position memory 124.

When the user turns on the power supply after returning home, in the television receiver 100*b*, the GUI as shown in FIG. 14 is displayed on the image display 112 in accordance with the information held in the play position memory 124. If the continuous content information is held in the play position memory 124, the still image at the lead is used as the index. The still images of the contents which the user could not view are listed and displayed as the index. When the remote control 116 or the operation 114 is used to select the particular still image, in the television receiver 100*b*, the digest stream from the preliminarily accumulated destination position is obtained from the HDD 126 and displayed on the image display 112. Consequently, the user can visually view the desired content on the screen.

With the above-mentioned procedure, the user can easily confirm only the content from the desired position visually in the television receiver 100*b*, without manually retrieving the position of the content that could not be viewed away from home.

Fourth Embodiment

A fourth embodiment of the present invention will be described below. The fourth embodiment has a feature different from the above-mentioned first, second and third embodiments in the method of holding the play position information.

In the fourth embodiment, in the television receiver 100, 100*a* or 100*b*, the position information of the content accumulated in the play position memory 124, which the user could not view in the cellular phone 300, and the still image information corresponding thereto are transmitted together with a user ID to a server 405 connected to the internet 403, when the communication with the cellular phone 300 is disconnected. The user ID is the information used to identify the cellular phone 300 with which the television receiver 100, 100*a* or 100*b* communicates. It is transmitted from the cellular phone 300 to the television receiver 100, 100*a* or 100*b*, when the TCP/IP connection is established between the television receiver 100, 100*a* or 100*b* and the cellular phone 300. The television receiver 100, 100*a* or 100*b* transmitting the information to the server 405 deletes the information from the play position memory 124.

If the user inevitably abandoned viewing the content in the cellular phone 300 in the middle because of the communication error, the decode error and the like, when returning home, the user can view the content by using the television receiver 100, 100*a* or 100*b* at the user's home. The user inputs the user ID to identify the private cellular phone 300 to the television receiver 100, 100*a* or 100*b*. In the television receiver 100*b* or 100*c*, the information necessary for it is obtained from the above-mentioned server, and the control is executed such that the user easily executes the re-viewing from the desired portion.

The employment of such configuration improves the environment for the usage by a plurality of users comfortable, and also enables the effective utilization of the resources of the television receivers 100, 100*a* and 100*b*.

This embodiment is designed such that the television receivers 100, 100*a* and 100*b* transmit the information to the server when the communication with the cellular phone 300 of the communication destination is disconnected. However, it may be changed to the configuration for sequentially transmitting the information in the middle of the communication.

Also, the present invention relates to the system for communicating the image/audio data between the television receiver and the information terminal apparatus. However, it can be also applied to the system for communicating the audio data between a music distributing apparatus and the information terminal apparatus such as the cellular phone.

This application claims priority from Japanese Patent Application No. 2003-410801 filed Dec. 9, 2003, which is hereby incorporated by reference herein.

What is claimed is:

1. A network information communication system, comprising (a) a display apparatus and (b) an information terminal apparatus which are connected through a network, the system communicating a video image data therebetween,
    wherein the information terminal apparatus includes:
    (1) a communicating unit which receives the video image data from the display apparatus through the network by TCP/IP communication;
    (2) a decode unit which decodes the video image data received by the communicating unit, which outputs the decoded video image data to a display unit of the information terminal apparatus, and which detects an occurrence of a decode error having occurred in the decode unit during receiving of the video image data, wherein the communicating unit notifies the occurrence of the decode error to the display apparatus through the network by turning on a decode flag of a TCP/IP header,
    wherein the display apparatus, which is connected with a video player, includes:
    (1) a communicating unit which transmits the video image data being played in the video player to the information terminal apparatus by TCP/IP communication;
    (2) a storage unit which stores a time stamp of a play position at which the decode error occurs by specifying the time stamp corresponding to a sequence number of the TCP/IP header of which the decode flag is turned on, and which stores a still image corresponding to the time stamp, in response to the notification of the decode error from the information terminal apparatus during the video image data communication;
    (3) a display control unit which controls to display the still image stored in the storage unit on a display unit of the display apparatus; and
    (4) an operation unit which selects the still image displayed on the display unit in accordance with a user's instruction, and
    wherein the video image data is played from the play position of the time stamp corresponding to the still image selected by the operation unit.

2. A network information communication system according to claim 1, wherein the storage unit (a) stores a plurality of time stamps respectively corresponding to a plurality of play positions at which the decode error occurs and (b) stores a plurality of still images respectively corresponding to the time stamps, in response to a plurality of times of notifications of the decode error from the information terminal apparatus during the video image data communication, and
    wherein the display control unit controls to display the still images stored in the storage unit as an index on the display unit.

3. A network information communication system according to claim 1, wherein the storage unit stores the time stamp and the sequence number to have a correspondence therebetween per each TCP segment and stores the still image corresponding to the time stamp, at a time of transmitting the video image data by the communication unit, and
    wherein the storage unit deletes the time stamp and the sequence number not corresponding to the play position at which the decode error occurs.

4. A control method for a network information communication system, the system comprising (a) a display apparatus and (b) an information terminal apparatus which are connected through a network, the system communicating video image data therebetween, wherein the control method includes steps of:
    receiving the video image data from the display apparatus through the network;
    decoding the video image data received in the receiving step and outputting the decoded video image data to a display for displaying;
    detecting an occurrence of a decode error having occurred in the information terminal apparatus during receiving of the video image data,
    notifying the occurrence of the decode error to the display apparatus through the network by turning on a decode flag of a TCP/IP header;
    storing, in the display apparatus, a time stamp of a play position at which the decode error occurs by specifying the time stamp corresponding to a sequence number of the TCP/IP header of which the decode flag is turned on, and a still image corresponding to the time stamp, in response to the notification of the decode error from the information terminal apparatus during the video image data communication;
    displaying, on a display unit of the display apparatus, the still image stored in the storing step; and
    playing, in response to selecting the still image displayed on the display unit, by a video player connected with the display apparatus, the video image data from the play position of the time stamp corresponding to the still image selected.

5. A control method according to claim 4, wherein during the storing step, (a) a plurality of time stamps are stored respectively corresponding to a plurality of play positions at which the decode error occurs and (b) a plurality of still images are stored respectively corresponding to the time stamps, in response to a plurality of times of notifications of the decode error from the information terminal apparatus during the video image data communication, and
    wherein, during the displaying step, the still images stored in the storage unit are controlled to be displayed as an index on the display unit.

6. A control method according to claim 4, wherein during the storage step, the time stamp and the sequence number are stored to have a correspondence therebetween per each TCP segment, and the still image is stored corresponding to the time stamp, at a time of transmitting the video image data during the communication step, and
    wherein during the storing step, the time stamp and the sequence number not corresponding to the play position at which the decode error occurs are deleted.

* * * * *